(12) United States Patent
Sugihara et al.

(10) Patent No.: US 6,947,813 B2
(45) Date of Patent: Sep. 20, 2005

(54) POWER DISTRIBUTION PANEL SWITCH GEAR AND A MONITORING AND CONTROL SYSTEM HAVING A DISTRIBUTION PANEL SWITCH GEAR

(75) Inventors: Masashi Sugihara, Hitachinaka (JP); Masayuki Fukai, Hitachi (JP); Akio Ito, Hitachi (JP); Katsuhito Shimizu, Hitachi (JP); Satoshi Kusaka, Hitachi (JP); Shigeaki Namba, Hitachi (JP); Toru Kimura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/777,895

(22) Filed: Feb. 13, 2004

(65) Prior Publication Data

US 2004/0162643 A1 Aug. 19, 2004

Related U.S. Application Data

(62) Division of application No. 10/444,955, filed on May 27, 2003, now abandoned.

(30) Foreign Application Priority Data

Jun. 6, 2002 (JP) ........................................ 2002-165046

(51) Int. Cl.[7] ................................................. G06F 11/00
(52) U.S. Cl. ..................... 700/286; 700/292; 702/183; 324/500
(58) Field of Search ................................. 700/286, 292; 702/183; 324/424, 500

(56) References Cited

U.S. PATENT DOCUMENTS

| 5,231,565 | A | * | 7/1993 | Bilas et al. .................. 700/22 |
| 5,572,510 | A | | 11/1996 | Koivu |
| 5,612,960 | A | * | 3/1997 | Stevens et al. .............. 714/712 |
| 5,748,079 | A | * | 5/1998 | Addy ..................... 340/539.21 |
| 6,005,759 | A | | 12/1999 | Hart et al. |
| 6,035,247 | A | | 3/2000 | Sugihara et al. |
| 6,111,548 | A | | 8/2000 | Braunlich et al. |
| 6,487,478 | B1 | * | 11/2002 | Azzaro et al. ................ 701/24 |
| 2002/0004758 | A1 | * | 1/2002 | Takechi ....................... 705/26 |
| 2003/0132753 | A1 | * | 7/2003 | Lavoie et al. ............... 324/424 |
| 2003/0191589 | A1 | * | 10/2003 | Fletcher et al. ............... 702/62 |

OTHER PUBLICATIONS

**Mikael Nordman, et al., TETRA radio in Monitoring and Control of Secondary Substations, Developments in Power System Protection, Conference Pulication No. 479 © IEE 2001.

* cited by examiner

*Primary Examiner*—Jayprakash N. Gandhi
(74) *Attorney, Agent, or Firm*—Dickstein Shapiro Morin & Oshinsky LLP

(57) ABSTRACT

A monitoring and control system is provided having a control device, arranged in a central controller room, which provides commands to power distribution panel switch gear located in the field. The switch gear transmits and receives controlling and monitoring signals through wireless communication applying an evanescent mode. The switch gear has a power circuit connected to a plurality of devices to be operated. The switch gear is a panel comprising metal and non-metal surfaces, so that a portion of wireless waves in the evanescent mode travel out of the panel. A receiver is provided for monitoring the wireless waves that travel out of the panel. The wireless signals are compared with information stored in a diagnostics database, and are diagnostically evaluated to determine whether the signals are within a known normal operating range.

6 Claims, 9 Drawing Sheets

POWER DISTRIBUTION PANEL SWITCH GEAR AND A MONITORING AND CONTROL SYSTEM HAVING A DISTRIBUTION PANEL SWITCH GEAR

The present application is a divisional of application Ser. No. 10/444,955, filed May 27, 2003, now abandoned the entire disclosure of which is incorporated herein by reference.

BACKGROUND OF THE INVENTION

1. Field of the Invention

The present invention relates to a power distribution panel switch gear, a monitoring and control system, and an equipment diagnostic system relating to the same.

2. Prior Art

In a conventional atomic power plant, a system for operating various types of process devices, subject to commands from the main control panel, is constructed. For example, as described in the article "Instrumentation and Control, Automated IV, and the Control and Automation of Power Plants" disclosed in the July number of "Thermal and Atomic Power Generation-1993", there are power plants equipped with a main control panel and a unit computer arranged in the central control room of the power plant, with an auxiliary-device sequence controller connected to the unit computer via a network, with an auxiliary-device interlocking relay panel connected to the auxiliary-device sequence controller, and with a power distribution panel switch gear connected to the auxiliary-device interlocking relay panel. In addition to a CPU for conducting sequential control, the auxiliary-device sequence controller has a digital output device for output of starting and stopping commands to auxiliary devices. The auxiliary-device interlocking relay panel has a process device protection circuit and a process device interlocking circuit, and these circuits consist of relays. The power distribution panel switch gear has various types of process devices, including a plurality of switches connected to, for example, motorized valves, pumps, and the like, opens and closes the switches in response to signals from the auxiliary-device interlocking relay panel, and supplies electric power to specified process devices. That is to say, when the relays within the auxiliary-device interlocking relay panel operate in response to the starting commands and other commands sent from the auxiliary-device sequence controller, only the specified switch of all switches arranged in or on the power distribution panel switch gear will close to supply power to the motorized valves and other devices.

In general, the network between the units in a system has a wired or wireless arrangement of network lines. A general-purpose LAN having a bus-type or ring-type connection form is present as an example of a wired network. Another example is a control LAN provided with a transmission protocol for ensuring faster and more highly reliable data transmission with respect to control equipment. An example of a wireless network is a star-type network using a GHz frequency band, such as the Bluetooth, a wireless LAN compliant with IEEE802.11, or an infrared-ray communication.

SUMMARY OF THE INVENTION

In the case of the related art described above, since each relay within the auxiliary-device interlocking relay panel and each switch of the power distribution panel switch gear are connected via independent cables and since the starting and stopping command signals relating to pump fans, the opening and closing command signals relating to motorized valves, and other command signals are also transmitted via cables, there are the problems that it is necessary to lay cables as many as there actually are the number of starting commands issued to the process relays functioning as the devices to be operated, and thus that the apparatus increases in dimensions.

An increase in the scale of the apparatus also poses the problems that the installation costs relating to each component of the apparatus correspondingly increase and hereby that the installation of the apparatus and the test processes thereof require longer periods of time.

In other words, since controllers are concentratedly installed in the central control room, process cables need to be laid over a long distance from the process devices to the central control room, this arrangement increases installation costs, coupled with increases in the number of input and output ports due to the scaling-up of the plant and the sophistication of the control system.

As the dimensions of the controllers increase with the sophistication of the control technology and function, the dimensions of the control equipment room also increase and this, in turn, increases installation costs.

In addition, since commands associated with the process device starting and stopping operations of an operator are output via the auxiliary-device sequence controller, the process devices cannot be tested until the installation of all devices, the installation of the power distribution panel, and the connection of process cables have been completed. Furthermore, in terms of the maintenance conduct to take place after the startup of the equipment, it is important to increase the operational availability of the equipment by diagnosing it as rationally as possible, apart from legal checking, and it has been strongly demanded for a long time that maintenance procedures be improved so as to enable both on-line and off-line safe maintenance.

Besides, because of the frequency characteristics of the radio waves which they use, conventional wireless LANs (for example, the wireless LANs using a GHz band) have the following problems:

(1) A sufficient sight distance between an access point (master station) and users (slave stations) must be ensured to obtain the required antenna electric field strength between stations, the layout of stations is prone to restriction during equipment layout planning and equipment installation, and reduction in introduction and maintenance costs has its limits.

(2) Since the frequency band used permits radio waves to easily leak to the building exterior, interference is prone to occur between the wireless LANs in connect adjacent buildings and dependence on a building-to-building basis cannot be easily ensured.

(3) When, in addition to the information service network constructed using existing wireless communication such as IEEE802.11, PHS, or infrared-ray communication, a new information service network is to be constructed using existing wireless communication, the types of wireless communications which can be provided side by side without causing interference are limited.

As described earlier in this document, it has been a long time since networking (LAN construction) that uses the above-mentioned GHz band, non-contact transmission that uses infrared-ray communication in the vicinity of manufacturing apparatuses or transport vehicles, and other various wireless communication technologies were put into use to transmit data in the plant engineering field. In spite of this, to apply wireless communication technology to the plant construction consisting of arranging equipment in a large-scale and complex building, it is strongly demanded that some type of improvement be provided particularly against the problems listed as item (1) above.

An object of the present invention is to provide a power distribution panel switch gear, and a monitoring and control system, that can be simplified in terms of configuration.

In order to achieve the above object, the power distribution panel switch gear pertaining to the present invention comprises: a plurality of control means provided in a power distribution panel so as to correspond respectively to a plurality of devices to be operated, and intended to control, in accordance with control commands, the driving of each above-mentioned device to be operated; a plurality of status input means for receiving the signals corresponding to the status of the above-mentioned plurality of devices to be operated; an operation monitoring information creating means by which, in accordance with the inputs from each above-mentioned status input means, monitoring information that includes information on at least either the protection or interlocking of each device to be operated is created; and a control command output means for sending control commands to a specified control means in accordance with the monitoring information created by the above-mentioned operation monitoring information creating means.

Also, the monitoring and control system pertaining to the present invention comprises: an operating and monitoring command output means for sending commands relating to the operation and monitoring of a plurality of devices to be operated; a plurality of control means provided in a power distribution panel so as to correspond respectively to the above-mentioned plurality of devices to be operated, and intended to control, in accordance with control commands, the driving of each above-mentioned device to be operated; a plurality of status input means for receiving the signals corresponding to the status of the above-mentioned plurality of devices to be operated; an operation monitoring information creating means by which information is exchanged with the above-mentioned operating and monitoring command output means and, in accordance with the thus-received information and the inputs from each above-mentioned status input means, monitoring information which includes information on at least either the protection or interlocking of each above-mentioned device to be operated is created; and a control command output means for sending control commands to a specified control means in accordance with the monitoring information created by the above-mentioned operation monitoring information creating means; wherein the above-mentioned operating and monitoring command output means and the above-mentioned operation monitoring information creating means are connected by using wireless communication as a communication means for information exchange between both means.

In addition, the present invention proposes additional-equipment methods relating to after-operation rational equipment diagnosis, based on the assumption of the above configurations. Furthermore, in order to enable equipment diagnosis, a device on-line/off-line maintenance service system is constructed outside the apparatus.

When constructing a monitoring and control system, it is also possible to provide, in addition to the elements of the system mentioned above, a plurality of auxiliary status input means for receiving the signals corresponding to the status of the above-mentioned plurality of devices to be operated, and an auxiliary operating monitoring information output means by which information relating to the operation and monitoring of the plurality of devices to be operated is output in accordance with the inputs from each auxiliary status input means, and to connect the above-mentioned auxiliary status input means and the above-mentioned auxiliary operating and monitoring information output means by using wireless communication as a communications means for information exchange between the above two types of means. In addition, when constructing each system, the following elements can be added:

(1) Among all the elements required for the execution of information exchange between an operating and monitoring command output means and an operation monitoring information creating means, at least only a serial transmission system is multiplexed by applying wireless communication to at least one transmission line within the serial transmission system.

(2) There is provided an operating and monitoring information input means by which, instead of commands from an operating and monitoring command output means, information relating to maintenance is input to an operation monitoring information creating means.

(3) There is provided an operating and monitoring information input means by which, instead of commands from an operating and monitoring command output means, information relating to the operation and monitoring of each device to be operated is input to an operation monitoring information creating means.

According to the above-described means, since the protection and interlocking of a plurality of devices to be operated can be controlled using a single power distribution panel switch gear, the configuration of the apparatus can be simplified.

Also, since the operating and monitoring command output means and the monitoring information creating means are connected using wireless communication as a communication means for information exchange between both means and the monitoring information creating means also uses wireless communication as an input means for input of information relating to the plant, when the protection and interlocking of the plurality of devices to be operated are controlled in accordance with the commands output from the operating and monitoring command output means, the operating and monitoring command output means can directly acquire the plant information input from the monitoring information creating means, and even in the case that some of the functions of the monitoring information creating means are not working, the operating and monitoring command output means can directly acquire the plant information input from the monitoring information creating means and undertake the non-working functions of the monitoring information creating means by using acquired information, with the result that the protection and interlocking of a plurality of devices to be operated can be safely controlled.

DETAILED DESCRIPTION OF THE INVENTION

A first embodiment of the present invention is described below using drawings.

Figure 1:
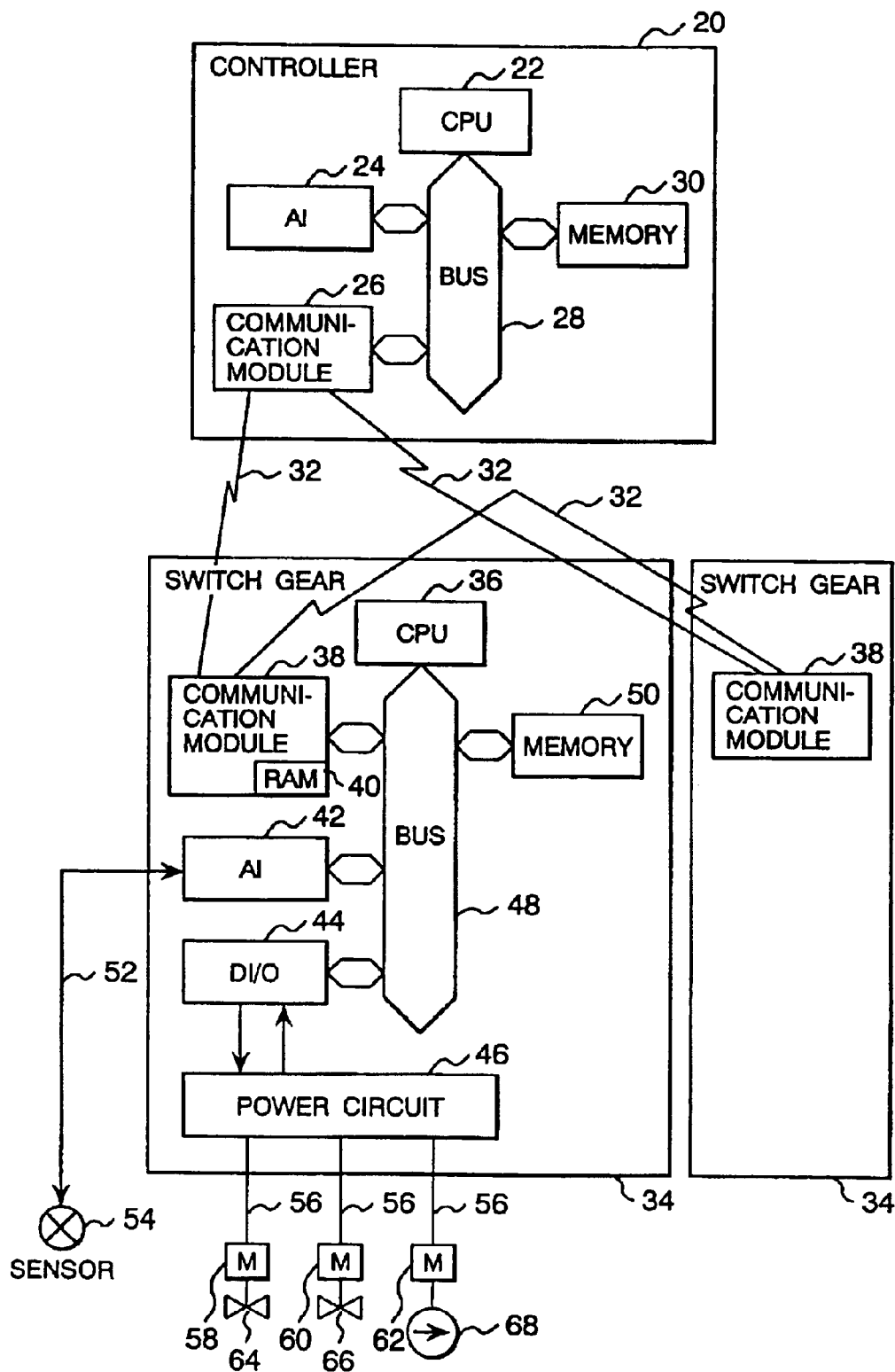
FIG. 1 is a configuration diagram showing the major blocks of a monitoring and control system which is a first embodiment of the present invention.
Figure 2:
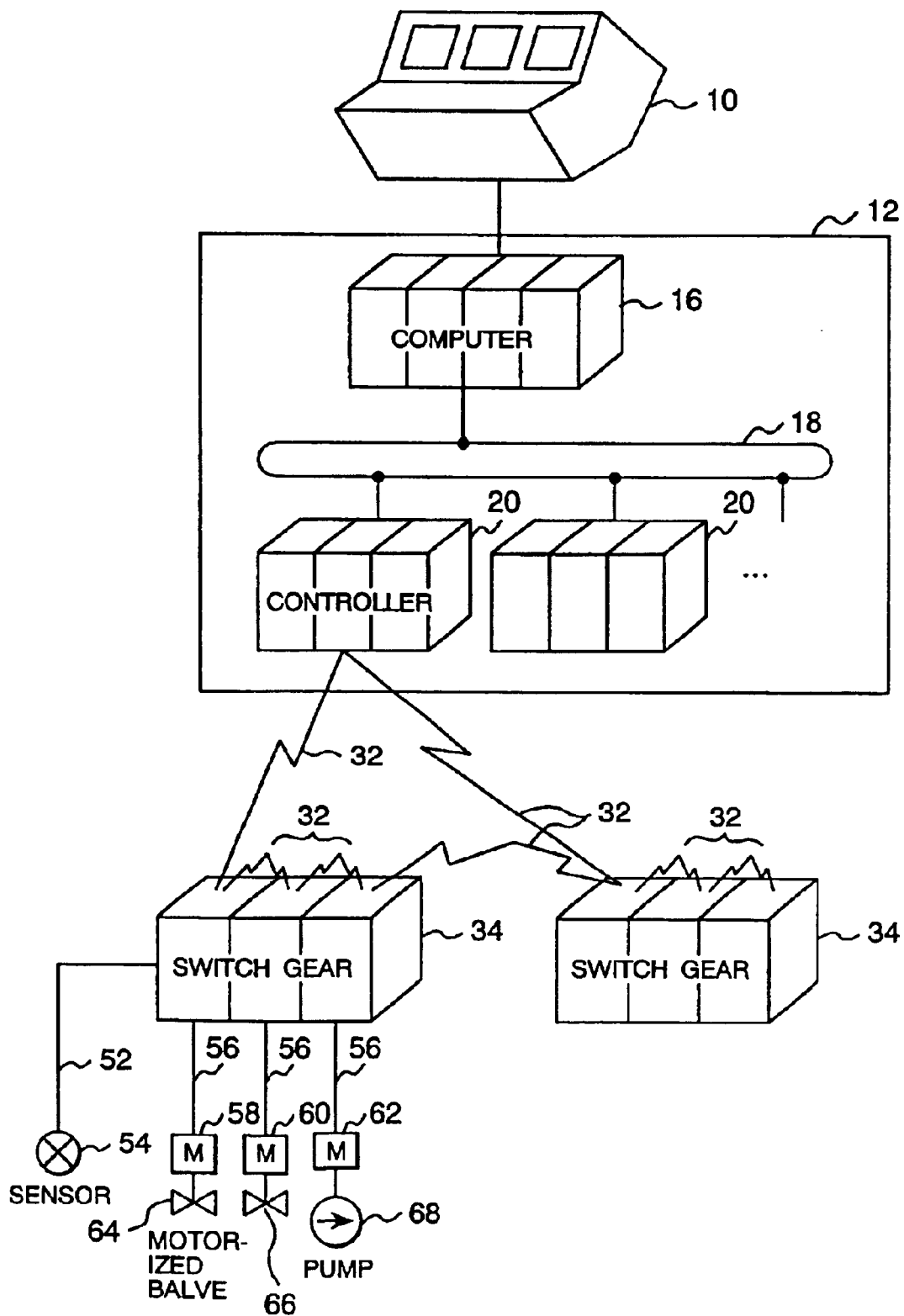
FIG. 2 is a total configuration diagram of the monitoring and control system.

FIG. 1 is a configuration diagram showing the major blocks of an monitoring and control system which embodies the present invention applied to a thermal power plant. FIG. 2 is a total configuration diagram of the monitoring and control system.

In FIGS. 1 and 2, a computer 16, a network 18, and a plurality of controllers 20 are installed in a central controller room 12, wherein the computer 16 is connected to each of the controllers 20 via the network 18 and also connected to a main control panel 10. The main control panel 10 receives the monitoring/operation-associated commands of an operator and transfers the thus-received commands to the computer 16. The computer 16 creates various monitoring/operation-associated control commands from the received commands and then transfers the thus-created control commands to each controller 20 via the network 18.

Each controller 20 has a plurality of operating and monitoring command output means for output of commands relating to operation and monitoring, each operating and monitoring command output means comprising a CPU 22, an analog input circuit 24, a communication module 26, a bus 28, and a memory 30, and the controller 20 is connected to a plurality of switch gears 34 by using evanescent communication 32 as a means of wireless communication in an evanescent mode which propagates electromagnetic waves via the structures of the corresponding building. In other words, the controller 20 not only exchanges commands with the computer 16 via the network 18, but also exchanges commands with one or more of the switch gears 34 via the evanescent communication 32.

The evanescent mode is described below. In this embodiment, as an example of wireless communication, the evanescent communication technology that uses the carriers of the frequencies neighboring a short-wave band is employed to construct the network. The evanescent communication technology uses an evanescent mode as the high-frequency electric field mode used for aerial propagation which functions as a wireless communication path. The evanescent mode is a mode in which electrical energy is to be propagated by using a high frequency lower than the cutoff frequency determined by the shape and size of a wave guide surrounded by a metal surface, and applying a high-frequency electric field exponentially attenuating in the longitudinal direction of the wave guide. It is known that a majority of wave guides use a frequency exceeding the cutoff frequency and propagate the traveling waves which change amplitude periodically in amplitude while at the same changing phase in the longitudinal direction of the wave guide. Since the evanescent mode does not change phase, this mode has the characteristic that a stable electric field can be obtained with exponentially monotonous decreases in amplitude. Under the evanescent communication technology, the building is regarded as a wave guide and the evanescent mode is formed inside the building.

(1) The building walls and the applied high-frequency current electrically excites the skeleton, conduits, and other internal structures of the walls.

(2) This high-frequency current causes the skeleton, conduits, and other internal structures electrically connected inside the building, to function as power supply paths, and propagates energy to the walls of each room.

(3) The walls surrounding each room produce evanescent waves in the room by the following two physical phenomena:

(a) The entire wall of the room operates as the radio-wave injection surface of a wave guide and produces the evanescent waves exponentially attenuating in a vertical direction with respect to the wall surface.

(b) A "two-layer surface-wave line" with a dielectric in contact with the surface of an electroconductor is formed, high-frequency current propagates through the dielectric, as a traveling wave, in a horizontal direction with respect to the wall surface, and evanescent waves exponentially attenuating in a vertical direction with respect to the wall surface extending from the surface of the dielectric to the inside of the room.

The electromagnetic wave behavior described in item (3) (a) above is an evanescent mode that occurs at less than the cutoff frequency of the wave guide, and details of this type of behavior are described in [The Feynman Lectures on Physics], Vol. III, Chapter 3, "wave Guide", Feynman, Leighton and Sands, Addison-Wesley Publishing Company (1965). Also, the electromagnetic wave behavior described in item (3) (b) above is due to the evanescent waves propagated from a surface-wave line which is a combination of an electroconductor and a dielectric, and details of this type of behavior are described in Electromagnetic-Wave Engineering for Students Specializing in Electrical/Electronic Engineering", written in Japanese by Naoki Inagaki and published in 1980 by Maruzen Co., Ltd.

With the evanescent communication technology, the use of a high frequency neighboring a short-wave band enables the required antenna electric field strength to be obtained inside the building, hereby enabling communication with individual rooms obstructed in terms of sight. Also, since operation at less than the characteristic cutoff frequency of the building does not allow the antenna electric field to leak to the outside of the building, it becomes possible to establish independent communication environments for each building and for each space surrounded by structures, piping, or the like.

Because of the frequency characteristics of their operating radio waves, conventional wireless LANs (for example, the wireless LANs using a GHz band) have the problems that a sufficient sight distance between an access point (master station) and users (slave stations) must be ensured to obtain the required antenna electric field strength between stations, that the layout of stations is prone to restriction during equipment layout planning and equipment installation, and that reduction in introduction and maintenance costs has its limits. To apply wireless communication technology to the plant construction consisting of arranging equipment in a large-scale and complex building, it is strongly demanded that some type of improvement be provided particularly against these problems.

In this embodiment, an evanescent mode is used as the wireless communication means for exchanging information. Hereby, it is possible to provide a wireless communication system that is easy to introduce and maintain, ensures inter-building dependence, and can be provided close to existing wireless communication systems. It is also possible to provide a wireless communication system that enables batch connection of controlling and monitoring equipment such as the computer, controllers, sensors, power distribution panel switch gears, actuators, and other elements arranged in a large-scale plant building of complex construction or in the place surrounded by the piping and structures of a plant.

Each switch gear 34 comprises a CPU 36, a communication module 38, a RAM (Random Access Memory) 40, an analog input circuit 42, a power circuit 46, a bus 48, and a memory 50, with the analog input circuit 42 being connected to a sensor 54 via a process cable 52 and the power circuit 46 being connected to motors 58, 60, and 62 via process cables 56. The communication module 38 has an evanescent communication transmitting/receiving section, and this communication module exchanges operation/monitoring-associated commands in accordance with the commands sent from the CPU 36, and also exchanges commands and information with the communication modules 38 of other switch gears 34. And either the commands that have been input to the communication module 38 or information based on internal processing by the CPU 36 is temporarily stored into the RAM 40.

The analog input circuit 42 is composed as a status input means by which signals relating to the status of the devices to be operated are input from the sensor 54, and the input signals, after being converted into digital signals, are transmitted to the CPU 36 via the bus 48. Information relating to the protection and interlocking of the motors 58, 60, and 62, and other devices to be operated, more specifically, information relating to, for example, data settings, and other information are stored within the memory 50. The CPU 36 is composed as a monitoring information creating means by which the monitoring information relating to the protection and interlocking of the devices to be operated is created from the information stored within the memory 50 and information which has been input from the analog input circuit 42. Also, the CPU 36 creates control commands from created monitoring information and then outputs created control commands to the power circuit 46 via a digital input/output circuit 44. The digital input/output circuit 44 is also composed as a control command output means for sending control commands to the power circuit 46. The power circuit 46 comprises switching elements arranged in the power distribution panel and connected to the motors 58 to 62, and each switching element is further connected to a power supply and when the switching element is turned on in response to a control command from the digital input/output circuit 44, power will be supplied to the motors 58 to 62. In other words, the power circuit is composed as a control means for controlling the driving of the motors 58 to 62 that are connected to motorized valves 64 and 66 and a pump 68.

Figure 3:
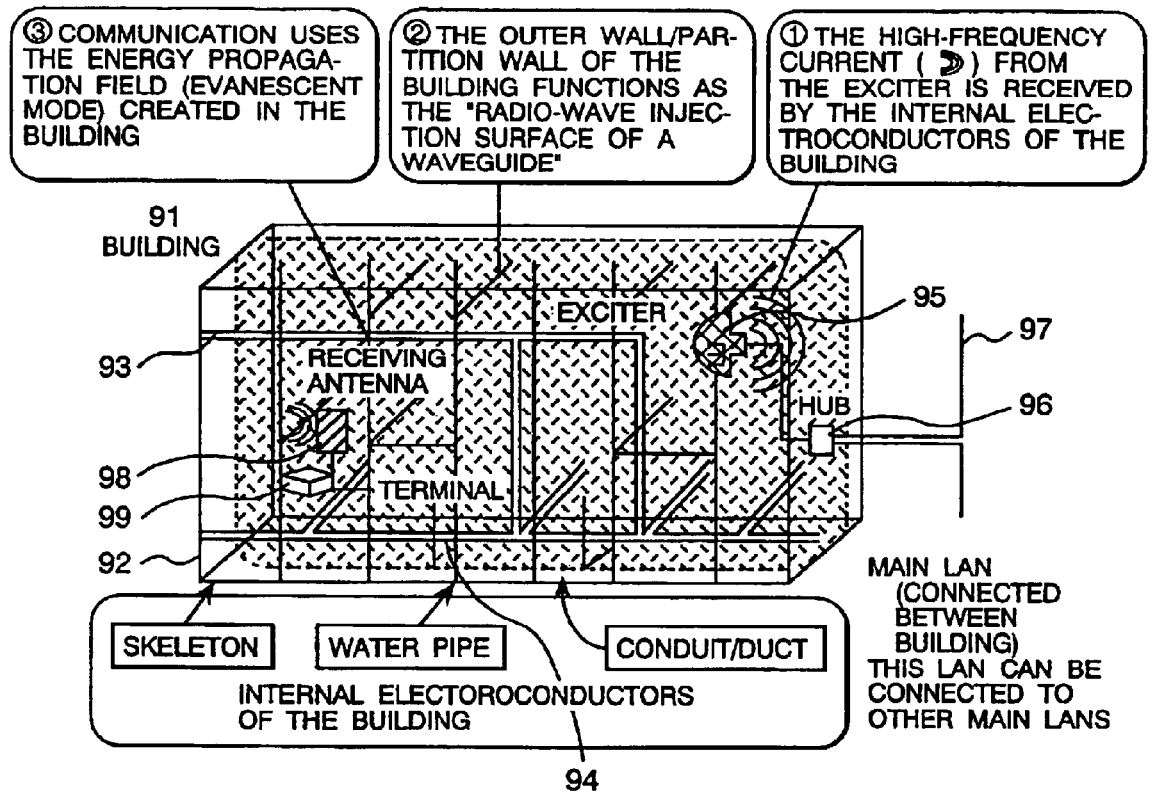
FIG. 3 illustrates the principles of evanescent communication technology.

FIG. 3 illustrates the principles of evanescent communication technology. In this figure, a building 91 is a mechanical connection of structures 92 such as skeleton, and the structures 92 are also electrically connected. In addition, a water pipe 93, a conduit/cable tray/duct 94, and other metallic members are arranged inside the wall of the building 91, between the floor and ceiling thereof, or in each room thereof.

That is to say, when evanescent communication technology is applied to a plant, the plant can also be a space surrounded by metallic members such as a pipe and structures. It suffices for this space just to have its approximate periphery covered with metallic members such as a pipe and structures, even if not fully surrounded by these members in enclosed form.

In addition to an electrical energy supply 95 (hereinafter, referred to as the exciter) that forms an electric field of an evanescent mode in each room of the building by applying a high-frequency current to the building structures 92, the water pipe 93, the conduit/cable tray/duct 94, and other electroconductors, the access point (master station) comprises a hub 96 for converting data and control signals into electrical energy, and vice versa. The hub 96 is connected to an intra-building or extra-building communication system or server via a wired or wireless external network system 97. In each room of the building, a user (slave station) is provided as a terminal 99 to which is connected an antenna 98 (hereinafter, referred to as the probe) that exchanges energy with the antenna electric field of the evanescent mode. The terminal 99 in FIG. 3 exchanges data with the communication system or server connected to the network system 97, and the terminal 99 itself can be such a computer system with data communication and processing functions that completes the services supplied to the user, or can be such a plant control apparatus, or such a mere sensor for input of process signals, that has only an added communication function.

Figure 4:
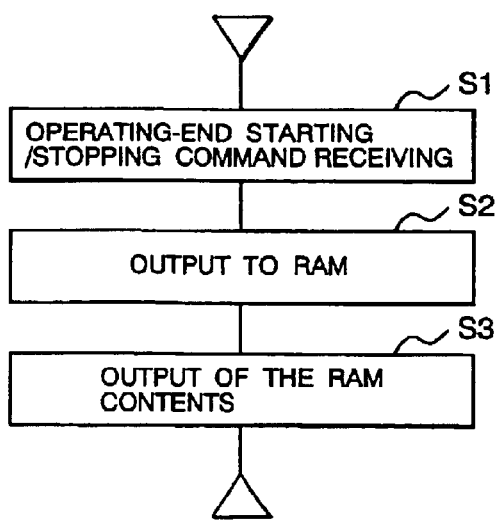
FIG. 4 is a flowchart explaining the operation of a communication module.

Next, the operation of the communication module 38 is described below in accordance with the flowchart of FIG. 4.

First, when the starting and stopping commands relating to the devices to be operated (operating ends) are transmitted from the controller 20 via the evanescent communication 32, these commands will be received in a step S1. After this, in a step S2, the received commands will be stored into the RAM 40, and then in a step S3, the contents of the RAM 40 will be output to the CPU 36 via the bus 48.

In this embodiment, when, in this way, commands associated with operation and with monitoring are output from the CPU 22 as a command-creating section for creating operation/monitoring-associated commands, these commands will be transmitted to each switch gear 34 via the communication module 38 and the evanescent communication 32. Accordingly, there is no need to connect cables between the controller 20 and each switch gear 34, and the apparatus can be simplified.

Also, since information other than that relating primarily to interlocking is used as the commands exchanged between the communication module 26 and the communication module 38 and since information that requires emergency, such as information relating to the protection and interlocking of the devices to be operated, is created by the CPU 36, the communication speed at which commands are exchanged between the communication module 26 and the communication module 38 is relatively low, and consequently, even if this speed is about 100 msec, operation is not affected.

In addition, since information that requires emergency, such as information relating to the protection and interlocking of the devices to be operated, even if the communication module 26 or the communication module 38 malfunctions, the protection and interlocking of the devices to be operated will function properly, which means that reliability can be improved.

Furthermore, it is also possible to adopt a configuration in which: each controller 20 is provided with a signal generator as a status judgment signal generating means for generating a status signal judgment signal indicating whether an abnormal status has occurred in the controller 20, and this signal generator is connected to the communication module 38 via a transmission system different from evanescent communication.

Figure 5:
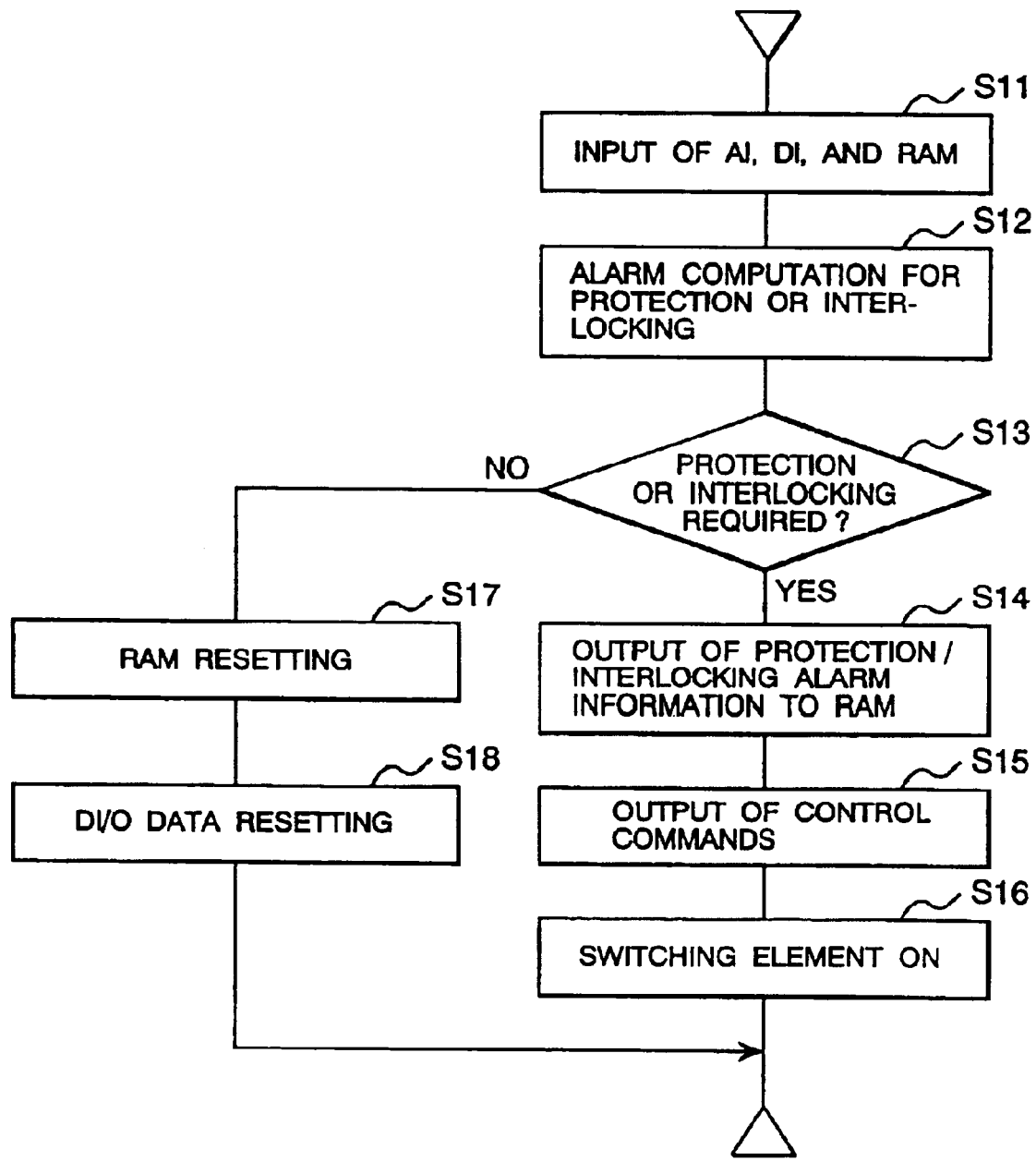
FIG. 5 is a flowchart explaining the operation of a switch gear.

Next, the operation of the switch gear 34 with the CPU 36 as its central element, is described below in accordance with the flowchart of FIG. 5.

First, in a step S11, the CPU 36 receives the contents of the RAM 40 and also receives information from the analog input circuit 42 and the digital input/output circuit 44, and in a step S12, creates information relating to protection and monitoring, from received information. After this, created information and the data settings that have been stored into the memory 50 beforehand are compared in a step S13, where it is then judged whether protection/interlocking is required. When protection/interlocking is required, first in a step S14, information relating thereto and information relating to alarming are stored into the RAM 40, and then in a step S15, control commands based on the two types of information are output to the power circuit 46 via the digital input/output circuit 44. Hereby, in a step S16, the specified switching element of the power circuit 46 turns on to execute the protection and interlocking of the devices to be operated.

Conversely, when protection/interlocking is required, among all sections of the RAM 40 and the digital input/output circuit 44, only sections relating to protection and interlocking are reset in steps S17 and S18, with the result that processing in this routine is terminated.

Since the operation relating to protection and interlocking requires emergency, the operation is executed at a communication speed of, for example, about 1 msec. Accordingly, if the abnormality (or the like) of any device to be operated is detected by the sensor 54, the corresponding device can be immediately protected.

In this way, under this embodiment, the apparatus can be simplified since batch control relating to the protection and interlocking of each device to be operated is conducted by the switch gear 34. More specifically, all control relating to the protection and interlocking of a plurality of devices to be operated can be simultaneously conducted via the switch gear 34 without laying the number of cables that corresponds to the commands relating to the operation of the pump 68, the motorized valve 64, or the like.

Also, even when devices to be operated (operating ends) are added, system construction can be easily executed by merely adding switch gears 34 as many as there actually have been added devices to be operated, and then connecting the added switch gears 34 to existing switch gears 34 via evanescent communication 32.

In addition, it is possible to multiplex the communication module 26, the evanescent communication 32, and the communication module 38, and to multiplex the RAM 40, the CPU 36, the memory 50, the bus 48, and the digital input/output circuit 44.

Figure 6:
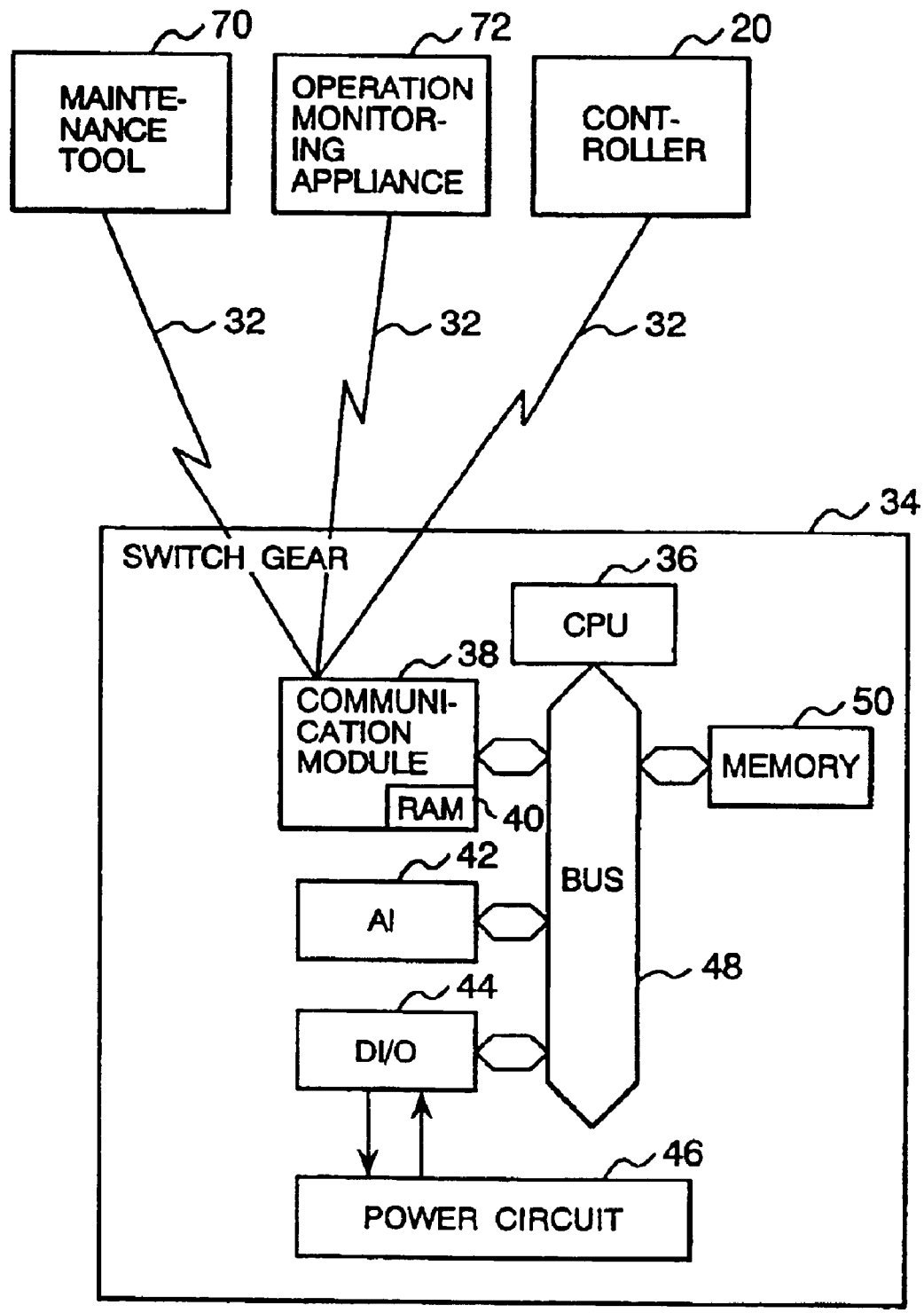
FIG. 6 is a configuration diagram showing the major blocks in a second embodiment of the present invention.

Next, a second embodiment of the present invention is described below using FIG. 6.

In this embodiment, a maintenance tool 70 and an operation monitoring appliance 72 are provided as a maintenance information input means and an operating and monitoring command input means, respectively, wherein the maintenance tool 70 and the operation monitoring appliance 72 are connected to a communication module 38 via evanescent communication 32, and other elements are configured similarly to those of the first embodiment described earlier in this application document.

In the second embodiment, when information relating to the addition, modification, and deletion of the contents of the memory 50 is entered by a monitoring person or the like by use of the maintenance tool 70, the information will be incorporated as maintenance information via the communication module 38 and maintenance will be performed on the internal information of the memory 50.

Maintenance of the information within the memory 50 can likewise be conducted by sending maintenance information, as input information, from the controller 20.

In addition, commands relating to operation and monitoring can be input from the operation monitoring appliance 72 to the switch gear 34 by the operations of the monitoring person.

Figure 7:
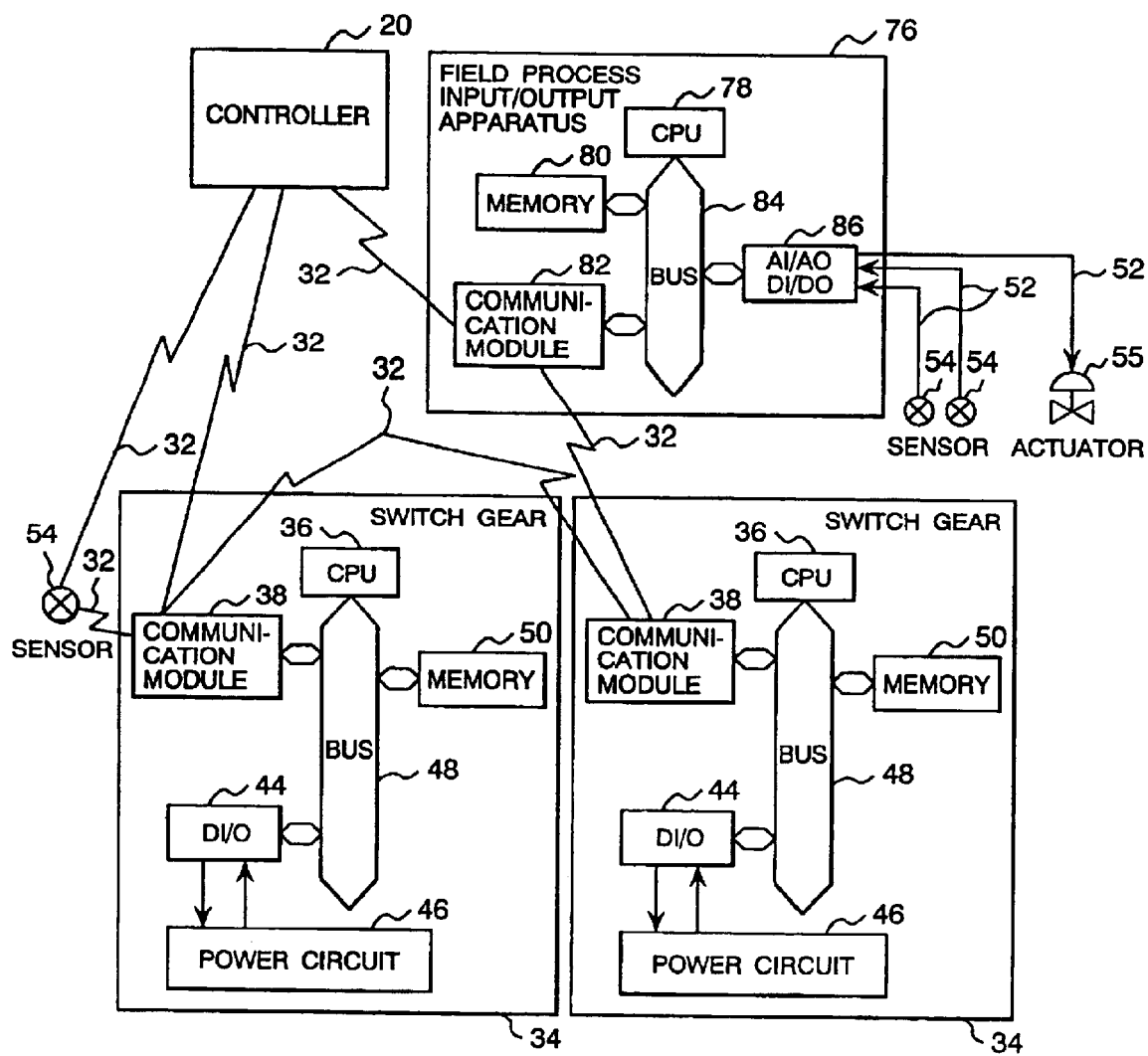
FIG. 7 is a configuration diagram showing the major blocks in a third embodiment of the present invention.

Next, a third embodiment of the present invention is described below using FIG. 7.

In this embodiment, a field process input/output device 76 is provided as a controller common to each switch gear 34, and the configuration of each switch gear 34 is the same as that of FIG. 1, except that the analog input circuit 42 is deleted from the switch gear 34.

The field process input/output device 76 comprises a CPU 78, a memory 80, a communication module 82, a bus 84, and an analog/digital input/output circuit 86, with the communication module 82 being connected to a communication module 38 of a switch gear 34 via evanescent communication 32 and the analog/digital input/output circuit 86 being connected to a plurality of sensors 54 and/or actuators 55 via process cables 52. After status information relating to the devices to be operated has been obtained using each sensor 54, the field process input/output device 76 first receives the information via the analog/digital input/output circuit 86, then creates, from the received information, protection and interlocking information relating to the devices to be operated, and transmits created information to the switch gear 34 via the communication module 82. Also, protection and interlocking information relating to the devices to be operated can be created from the received information mentioned above, and the thus-created information can be output to the actuators 55 via the analog/digital input/output circuit 86.

According to this embodiment, by arranging the field process input device 76 near an operating end, operation and monitoring can be executed at the operating end.

Also, the system can be configured so as to enable input of all or some of analog/digital signals with the switch gear 34 to be implemented either without, in this way, using evanescent communication, or by, as with the conventional practice, using process cables in conjunction with evanescent communication.

In addition, commands and information can be directly exchanged between the communication module 82 of the field process input/output circuit 76 and the controller 20.

Furthermore, the signals of each sensor 54 can be sent directly from the sensor-fitted communication module to the switch gear 34 or the controller 20 by use of an evanescent, not via the field process input/output device 76.

Figure 8:
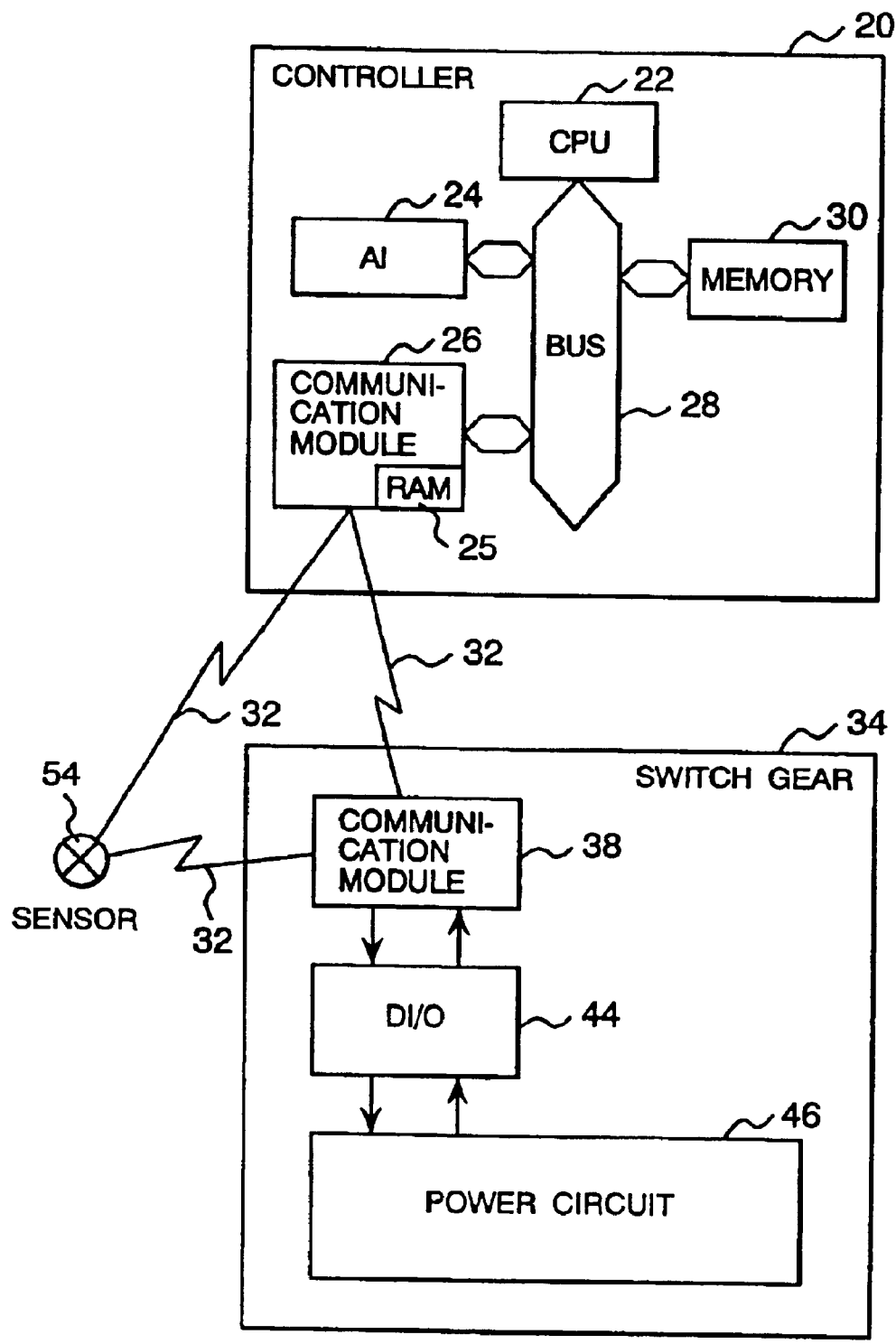
FIG. 8 is a configuration diagram showing the major blocks in a fourth embodiment of the present invention.

Next, a fourth embodiment of the present invention is described below using FIG. 8.

The controller 20 has a plurality of operating and monitoring command output means for output of commands relating to operation and monitoring, each operating and monitoring command output means comprising a CPU 22, an analog input circuit 24, a communication module 26, a bus 28, and a memory 30, and the controller 20 is connected to a plurality of switch gears 34 by using evanescent communication 32 as a means of wireless communication in an evanescent mode which propagates electromagnetic waves via the structures of the corresponding building.

The communication module 26 is composed as a status input means by which signals relating to the status of the devices to be operated are input from a sensor 54 or a communication module 38, and the input signals, after being converted into digital signals, are transmitted to the CPU 22 via the bus 28. Information relating to the protection and interlocking of the devices to be operated, more specifically, information relating to, for example, data settings, and other information are stored within the memory 30. The CPU 22 not only creates, from information that has been stored into a RAM 25 and the memory 30 and information that has been input from the communication module 26, monitoring information relating to the protection and interlocking of the devices to be operated, but also creates control commands based on created monitoring information and then outputs created control commands to the communication module 26. The communication module 26 is composed as an operating and monitoring command output means by which the control commands that have been created by the CPU 22 are output in evanescent mode to the communication module 38 of the switch gear 34.

The switch gear 34 comprises the above-mentioned communication module 38, a digital input/output circuit 44, and a power circuit 46. The communication module 38 has an evanescent communication transmitting/receiving section and the like, exchanges operation/monitoring-associated commands with the communication module 26 or the sensor 54, and after receiving control commands from the communication module 26, outputs these control commands to the power circuit 46 via the digital input/output circuit 44.

As heretofore set forth, according to the embodiments shown in FIGS. 1 to 8, operational and monitoring control relating to a plurality of devices to be operated can be conducted with a single power distribution panel and hereby, the apparatus can be simplified. Also, since the operating and monitoring command output means and the monitoring information creating means are connected via wireless communication, there is no need to provide transmission lines as many as there actually are commands, and this contributes to the simplification of configuration and to reduction in the dimensions of the system.

In addition, since the operating and monitoring command output means and the monitoring information creating means in a plurality of switch gears are directly connected via wireless communication so as to exchange commands and information, interruptions due to trouble with the communication module of a specific switch gear or due to communication cable disconnections do not occur during communication with the field process input device and hereby, contribution to the improvement of the communication in reliability is possible.

Figure 9:
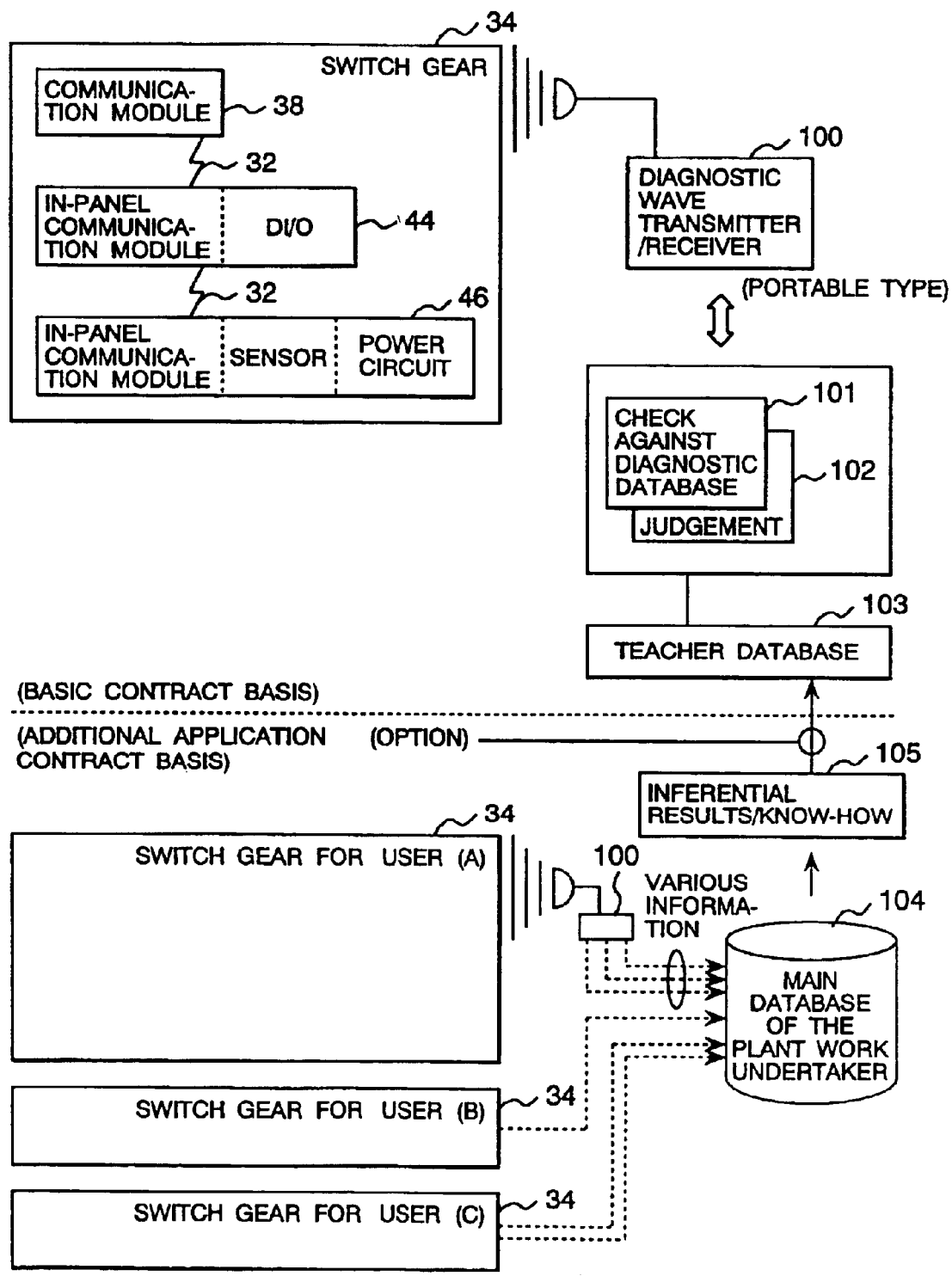
FIG. 9 is a configuration diagram showing the major blocks in a fifth embodiment of the present invention.

Next, a fifth embodiment of the present invention is described below using FIG. 9. FIG. 9 is a diagram in which, in addition to the elements in the example of a switch gear configuration that is shown in FIG. 8, a portable type of diagnostic wave transmitter/receiver 100 and other elements are provided in the external space of the apparatus, although a method of communication with the apparatus exterior is not specified, in order to achieve wireless transmission of intra-apparatus monitoring and controlling signals with the view to applying evanescent mode, in particular. The diagnostic wave transmitter/receiver 100 has the characteristics that it permits only partial leakage of wave motions to extra-panel proximate sections and to positions in which, as one feature of the diagnostic wave transmitter/receiver, wireless waves properly loop to the back of shielding substances. By utilizing these characteristics, the diagnostic wave transmitter/receiver 100 undertakes the transmitting of the wave motions required for diagnosis and the receiving of wave motions from the internal apparatus components of the panel, at those identified positions and sections. Regarding the problem of whether sufficient external electric field strength can be obtained, the panel needs to be structurally improved as a corrective measure against the insufficiency of the above strength. The above problem, however, can be solved by using nonmetallic materials for structural members, only if the improvement of the panel in structural design, for example, is such that the penetrability required of the wave motions of the above-mentioned wireless waves in evanescent mode can be obtained without deviations from the allowable ranges of drip-proofing and dust-proofing. Positionally, there is no problem if evanescent-mode wave motions can be exchanged at intra-panel and extra-panel proximate sections (whether they be at the left/right, front/rear, or top/bottom of the panel) and at the boundary section between the panel interior and exterior. Since the power distribution panel switch gear contains a power circuit and is designed so as to ensure the necessary electrical insulating distance and since the mechanism for obtaining information relating to maintenance and diagnosis needs to be provided with the appropriate measures for ensuring electrical safety of major power distribution panel mechanical sections and for preventing electrical shock in human-accessible areas for maintenance, the sections mentioned above must be such that the above safety is degraded. In terms of equipment diagnosis, since careful attention must be paid so as not to adversely affect normal operating conditions, the panel is constructed so that in-panel controlling and monitoring signals can be properly read outside the panel.

During diagnosis, the diagnostic wave transmitter/receiver 100 first uses a diagnostic database checker 101 to check stored information against a diagnostic database, and then uses a diagnostic judgment device 102 to judge the results. Also, during the diagnosis, an operating range acknowledged to be normal operating range is retained as a database 103 (teacher data: the allowable range in normal operating areas for each device to be diagnosed), and although these factors are not shown in this embodiment, the design at the initial phase of plant construction and the data obtained during test operation of the plant are applied. Information with assigned margins on strength, on shifts in the operation time required, and on other factors, is retained, as typical such data, for each process signal. In addition, such information/data assumes that it is disclosed as basic data from the plant operation undertaker to the company who undertakes maintenance and diagnosis of the plant. This maintenance and diagnosis undertaker can be the owner company of the plant. This embodiment assumes, however, that the maintenance and diagnosis undertaker is a company taking a different form of business.

Although this is a supplement to the above, examples of the basic teacher data stored into and checked against the database include: signals (codes) for identifying the auxiliary devices to be diagnosed and the respective driving motors, and information relating to the response levels (response time) of the operating signals at the lowest level of the control system from the receiving of control signals, or; data for judging whether, in the correlation between the starting current values measured as a result of actual response of the auxiliary devices (also, referred to as the operating ends) from startup control signal receiving, contactor (contact point) closing signals, and the strength levels (such as limit switch signal levels) obtained as a result of operation of interlocks at the field side, and the elapse of time, the particular deviation is within a certain normal range.

Or for problems relating to deterioration, since the basic teacher data is for electrical products, it can be data intended to check historical records of each product in order to examine whether a normal range is overstepped in the event that depending on particular changes in thermal conditions, the product has a tendency to decrease or increase in operation time after being repeatedly used a plurality of times for trial.

Since the plant user usually does not wish to reduce the availability of the equipment, it is desirable that the diagnosing processes described above should be performed off-line. Although some of the controllers, monitoring devices, and other devices already containing a CPU have a function for self-judging whether the functional section of the device is normal or abnormal, an independent wireless system assuming the total operation of the power distribution panel switch gear itself is not reported. This is probably because, since it is a general technical practice to apply a wired system to exchanging signals relating to the control and monitoring of the power distribution panel switch gear itself, importance has been attached only to ensuring independent reliability of electrical products and there has been the lack of the trend towards achieving total rationalization by applying a wired system.

The diagnostic wave transmitter/receiver 100 has made it possible to reduce the rationalization of in-panel power circuit cabling by utilizing the advantage that this diagnostic wave transmitter/receiver has the performance to loop wireless waves to the back of obstructions in evanescent mode, and to diagnose the equipment on-line by ensuring external extraction of specific signals and the injection thereof. In addition, for conventional electrical products, although, even if the elements or sections of their power circuits require modification, this usually makes it necessary to modify related small-current circuit sections as well, it can be safely said that the diagnostic wave transmitter/receiver has paved the way to enabling removal of such necessity. Furthermore, in view not only of on-line diagnosis, but also of off-line diagnosis, since the diagnostic wave transmitter/ receiver contributes to reducing high-band and low-band frequency signal noise and interference due to the use of wireless waves, and to identifying specific signals in a single frequency band, operational soundness of the corresponding power distribution panel switch gear can be checked from outside.

In terms of maintenance and diagnosing business profitability, the status of simplified individual devices and combined/integrated functions at strict signal levels can be confirmed since wired cabic connection to the hardware of these devices becomes unnecessary. When on-line and off-line operation forms are integrated, this means the possibility that the plant operation company will be able to easily obtain preliminary-level abnormality detection information more accurate than the alarming information obtained at normal operating level, and thus that the significantly useful information serving as the base for establishment of matching between equipment renewal, maintenance planning, and plant operation planning, will be obtainable from that company. It can be safely said, therefore, that these will extend the total operation time and renew the equipment according to plan, and hereby that the above will directly yield economical merits.

Conversely, when viewed from the standpoint of the company who supplies the corresponding service, the plant maintenance and diagnosing business can be performed by exchanging the specified types of signals, without physical alteration or modification of hardware according to the particular equipment specifications of the plant operation company who uses the service supplied. Therefore, the risk of destruction of the user property during the service is minimized and since the type itself of service is maintenance and diagnosis, it can be said that supplying the service is an act in which schedules and time are specified. For these reasons, it is possible to routinize processes from the management of operating time to the presentation of the send/ receive signal details as working evidence, chart data relating to these signal details, and diagnostic results on analytical products, and thus for the service provider to enjoy the merits obtainable from the diagnosing business which uses evanescent mode.

Although, when viewed from aspects of profitability, this maintenance and diagnosing business is to be expanded using the above-mentioned data as its fundamental data, the scope of business execution for which a contract will be concluded between the plant operation company and the maintenance and diagnosis undertaker is not defined. That is to say, the maintenance and diagnosis undertaker is to separate the handling of result-reporting-associated mandatory data and that of additional know-how and data, and to present, under the conditions of onerous addition, not only the reliability and accuracy levels of the know-how and data added, but also the analytical results on recommended data that will be obtained in advanced technical fields.

At this time, when entering into an initial contract, the maintenance and diagnosis undertaker shall obtain agreement from the plant operation company as to the use of measurement result information for general purposes, and under these conditions, the plant operation company shall be able to receive the presentation of such general-purpose information in order to achieve the further sophistication and higher accuracy of the diagnosing technology for the plant equipment operated by the corresponding company itself. Here, for the sake of convenience in description, the plant operation company (namely, the user) shall be able to ask for only the basic diagnostic judgment limited merely to the company's own plant, instead of asking for the above-mentioned general-purpose information. In that case, the exclusive relation between both parties shall be termed the "basic contract", and when the presentation of know-how from general-purpose data is included, this shall be termed an "additional application contract." Although this additional application contract is described as an optional contract for the sake of convenience, this contract does not mean a mere optional contract. Instead, it shall be an optional contract offering the merit that the comprehensive information-judgment information relating to a group of power distribution panel switch gears that includes the supplied own company's plant information and is now used for general purposes at a great number of plants can be obtained.

When concluding contracts with each plant operation company, the maintenance and diagnosis undertaker shall be able to trade on a market-price basis using an Internet-related information terminal or the like. Market-price trading is called here because, under the situation that even in the case of general power distribution panel switch gears, new and old models are actually used in mixed form in line with the innovations of the age, the greatest interest of plant operation users is to obtain information relating to the models in operation at their own business establishments. Or the greatest interest of plant operation users may exist in considering the selection of a next-term new model, but is not discussed herein. In short, before the base for the additional application contract can be established, the maintenance and diagnosis undertaker must recognize merits by conducting overall analyses on the presentation of the company's own information, on supply of the appropriate useful information from each the user, and on expenses.

Although the flow of information from inferential results/know-how 105 to teacher database 103 is shown in FIG. 9, the information shall not be merely incorporated into teacher data. Instead, the information shall be referential information defining the stance of general-purpose-like usage status information. In terms of the number of types of information acquired into the database of the diagnosing company, user A is the greatest of all users shown at the bottom of FIG. 9, and user C is the second, followed by user B. These differences are based on the assumption that the types themselves of to-be-diagnosed device information that are determined between the maintenance and diagnosis undertaker and each user will usually differ.

Figure 10:
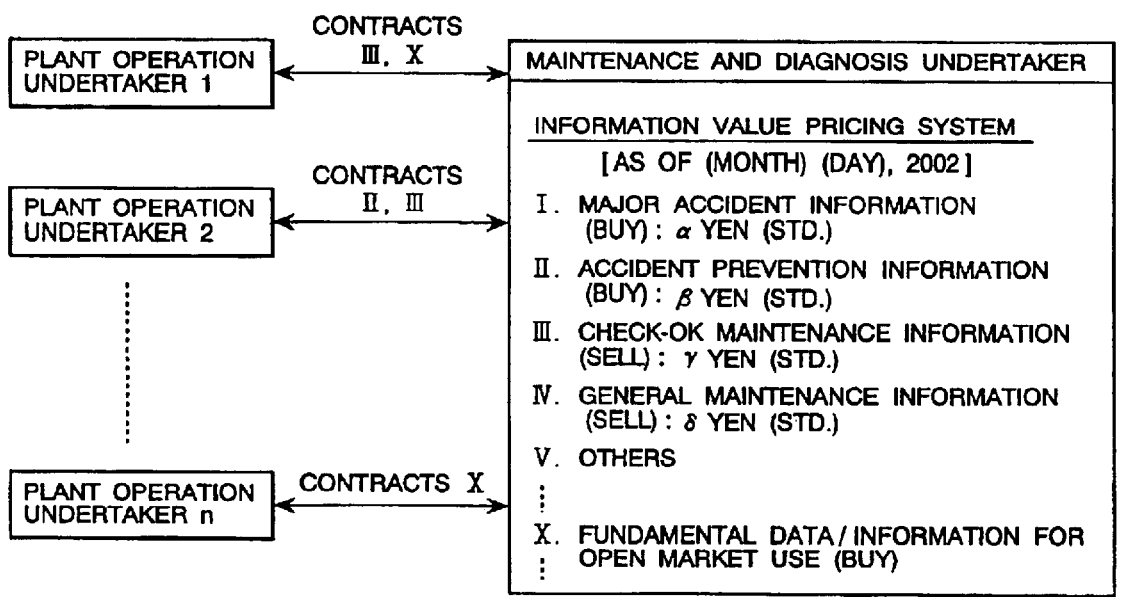
FIG. 10 is a configuration diagram showing the major blocks in a fifth embodiment of the present invention.

FIG. 10 is a representation of the description of the above sections when viewed as different contracts. The settings of the types of information provided by the maintenance and diagnosis undertaker are shown with Greek numerals in the figure. These numerals indicate that the contract pattern differs between the particular plant operation company and the maintenance and diagnosis undertaker. The "(Buy)" or "(Sell)" shown in the menu section of each setting is determined by whether the value of the information in the pricing system at the particular point of time becomes a merit for which party. More specifically, if, to the plant operation company, the information supplied therefrom is used for general purposes and this company gets an economical merit by receiving the presentation of such general-purpose information in return, the company will buy the information, or conversely, if the maintenance and diagnosis undertaker strongly wishes to line up the corresponding information as a menu, the information will be sold. Since, in this way, the value of information depends on the respective parties' thoughts, the value of information is to be traded in on a market-price basis. In the world, there are a number of companies designing and/or manufacturing power distribution panel switch gears, and these products vary in function, price, and type, even though they do not vary as significantly as vehicle models. There are also model changes. For these reasons, the value of the above information is trade in under the concept of market pricing.

Since power distribution panel switch gears are electrical products, these products are designed and manufactured in compliance with the standards of the countries in which they are used. Exposure to environmental conditions not assumed, that is to say, use under too high temperatures or too high humidities may lead to insulation breakdown, resulting in unexpected accidents. Since the occurrence of such an accident-causing event may not only interrupt lower-level power, but also lead to fire, failure to monitor for insulation deterioration each day or to make sufficient daily efforts towards maintaining the in-panel equipment always in a sound condition will result in significant effects being caused by damage. A contribution to these maintenance efforts is the power distribution panel switch gear information proposed herein for use at other places. The information, if made open-marketable by a plant operation company "n" on its own discretion, will only be sold (but to the maintenance and diagnosis undertaker, the information will be a buy).

The concept of market-price trading of the above-described information is like this: tradable information is disclosed through the Internet web site opened by the maintenance and diagnosis undertaker, and with the starting point of trading set at the items and other conditions presented there by the maintenance and diagnosis undertaker, the price of value is adjusted according to not only the condition items adaptable to the power distribution panel switch gears owned by individual plant operation companies, but also the range in which details can be presented. When there is a point at which both parties meet halfway, a contract is established, and when this contract forms a pair with the "basic contract" described earlier in this application document, both contracts can be processed as one integrated contract reflecting the price of the value.

In this way, in terms of maintenance and diagnosing business profitability, the status of simplified individual devices and combined/integrated functions at strict signal levels can be confirmed from an independent system, without making hardware-like alterations or modifications to the normal usage sections of the intended system. And when on-line and off-line operation forms are integrated, the plant operation company will be able to easily obtain preliminary-level abnormality detection information more accurate than the alarming information obtained at normal operating level. More specifically, the significantly useful information serving as the base of establishment of matching between equipment renewal, maintenance planning, and plant operation planning, will be obtainable and accordingly, since the total operation time will be extended and the equipment will be renewed according to plan, economical merits will be yielded.

Conversely, when this business is considered from the standpoint of the company who supplies the service, the business can be performed by exchanging the specified types of signals, without physical alteration, modification, connection, or disconnection of hardware according to the particular equipment specifications of the plant operation company who uses the service supplied. Therefore, the risk of destruction of the user property during the service is minimized and since the type itself of service is a diagnosing act based on schedules and time, it is possible to easily routinize processes from the management of operating time to the presentation of the send/receive signal details as working evidence, chart data relating to these signal details, and diagnostic results on analytical products, and thereby the service provider can enjoy the merits obtainable from the diagnosing business which uses evanescent mode.

Also, since this maintenance and diagnosis undertaker can construct a new data supply business based on the sharing of the maintenance and diagnostic information relating to general electrical products, namely, power distribution panel switch gears, this undertaker can integrate the diagnostic information and other information to be supplied to other users, namely, plant operation companies, and expand this business into additional ones by adding prices to the value of the information presented on the grounds that a contract is concluded so as to enable the information to be supplied as a diagnostic service for other users.

According to the present invention, it is possible to provide a power distribution panel switch gear, and a monitoring and control system, that can be simplified in terms of configuration.

What is claimed is:

1. An equipment diagnostic system comprising:
a power distribution panel switch gear arranged near a plurality of devices to be operated, said power distribution panel switch gear comprising a panel having metal and non-metal surfaces;

a communication module, arranged in the power distribution panel switch gear, for receiving and transmitting instructions to said plurality of devices using wireless communication in an evanescent mode;

a controller, arranged in a central control room, for transmitting instructions to said power distribution panel switch gear through wireless communication;

a receiver for receiving wireless communication waves, in an evanescent mode, emanating from said power distribution panel switch gear, and a diagnostic judgment device for diagnosing whether information content of the wireless communication waves received by said receiver is within an operating range acknowledged to be a normal operating range.

2. The equipment diagnostic system according to claim 1, wherein said diagnostic judgment device detects precursory indications of abnormality or deterioration by analyzing the information content of the wireless communication waves existing under normal operating conditions of said power distribution panel switch gear, and judges whether amounts of change of the information content of the wireless communication waves have deviated from a normal range.

3. The equipment diagnostic system according to claim 1, wherein said diagnostic judgment device has a transmitter which can transmit test wireless signals in a single frequency band, in addition to the wireless communication wave signals, used inside said power distribution panel switch gear under the normal operating conditions thereof.

4. The equipment diagnostic system according to claim 1, wherein said diagnostic judgment device has a transmitter which can transmit test wireless signals in a non-single frequency band, in addition to the wireless wave communication signals, used inside said power distribution panel switch gear under the normal operating conditions thereof.

5. The equipment diagnostic system according to claim 1, wherein the metal surfaces in any section of the power distribution panel switch gear comprise a material which enables penetration of the wireless communication waves.

6. The equipment diagnostic system according to claim 1, wherein, after information has been received from said power distribution panel switch gear, said diagnostic judgment device stores the information into a database and outputs the information according to a value-judging market price indicating a degree of usefulness of the information.

* * * * *